(12) United States Patent
Salter et al.

(10) Patent No.: US 9,093,766 B2
(45) Date of Patent: Jul. 28, 2015

(54) CONDUCTIVE INK ELASTOMERIC MOLDED CONNECTOR

(71) Applicant: Ford Global Technologies, LLC, Dearborn, MI (US)

(72) Inventors: Stuart C. Salter, White Lake, MI (US); Jeffrey Singer, Canton, MI (US); Michael Istok, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 14/036,080

(22) Filed: Sep. 25, 2013

(65) Prior Publication Data

US 2015/0087163 A1    Mar. 26, 2015

(51) Int. Cl.
*H01R 13/24* (2006.01)
*B29C 45/14* (2006.01)
*H01R 12/71* (2011.01)
*H01R 12/73* (2011.01)

(52) U.S. Cl.
CPC .......... *H01R 13/24* (2013.01); *B29C 45/14467* (2013.01); *H01R 12/714* (2013.01); *H01R 12/737* (2013.01)

(58) Field of Classification Search
USPC ............................... 439/66, 67, 65, 81, 91, 77
See application file for complete search history.

(56) References Cited

U.S. PATENT DOCUMENTS

| | | | | |
|---|---|---|---|---|
| 4,636,018 A | | 1/1987 | Stillie | |
| 4,793,814 A | | 12/1988 | Zifcak et al. | |
| 5,147,207 A | * | 9/1992 | Mowry | 439/66 |
| 5,427,535 A | * | 6/1995 | Sinclair | 439/66 |
| 5,447,442 A | * | 9/1995 | Swart | 439/77 |
| 5,484,295 A | * | 1/1996 | Mowry et al. | 439/66 |
| 6,286,208 B1 | * | 9/2001 | Shih et al. | 29/879 |
| 7,234,950 B1 | * | 6/2007 | Wickett | 439/78 |
| 7,303,403 B2 | * | 12/2007 | Kuwahara | 439/66 |
| 7,447,041 B2 | * | 11/2008 | Brandenburg et al. | 361/760 |
| 7,473,102 B2 | * | 1/2009 | Colgan et al. | 439/66 |
| 7,537,464 B2 | * | 5/2009 | Brandenburg et al. | 439/76.1 |
| 8,044,502 B2 | * | 10/2011 | Rathburn | 257/692 |
| 8,587,132 B2 | * | 11/2013 | Zhao et al. | 257/778 |
| 2001/0049207 A1 | | 12/2001 | Sakata et al. | |
| 2003/0146510 A1 | * | 8/2003 | Chien | 257/738 |
| 2012/0314382 A1 | | 12/2012 | Wesselmann et al. | |
| 2013/0200515 A1 | * | 8/2013 | Hwang et al. | 257/737 |

OTHER PUBLICATIONS

"An Investigation of the Mechanical Behavior of Conductive Elastomer Interconnects", Microelectronics Reliability, vol. 41, Issue 2, Feb. 2001.

* cited by examiner

*Primary Examiner* — Alexander Gilman
(74) *Attorney, Agent, or Firm* — Vichit Chea; Price Heneveld LLP

(57) ABSTRACT

An electronic connector system includes one or more electronic components electronically coupled to one another by an elastomeric connector. The elastomeric connector is disposed in a compressed condition against the one or more electronic components to form a sound electrical connection therebetween. A casing is provided about the elastomeric connector to retain the elastomeric connector in the compressed condition as coupled to the one or more electronic components. The casing may be an overmolded polymer that is injection molded about the electrical connection between the elastomeric connector and the one or more electronic components.

16 Claims, 4 Drawing Sheets

CONDUCTIVE INK ELASTOMERIC MOLDED CONNECTOR

FIELD OF THE INVENTION

The present invention generally relates to a connector assembly for electronic components, and more particularly, to an enhanced electrical connector system and method of making the same.

BACKGROUND OF THE INVENTION

Various electronic devices include printed circuit boards (PCB) that must be coupled to various electronic components. Such connections may be rigid in nature or flexible to allow for mild disruption of electronic components as disposed within an electronic device. Known methods of connecting a PCB to another electronic component may include using a zero insertion force (ZIF) integrated circuit (IC) socket or electrical connector, which may include a generally flexible tail or ribbon portion having conductive elements disposed therein to electronically couple the PCB with an electronic component. These types of connections often take up too much space within the limited confines of an electronic device and can have issues with connection reliability over the life of the electronic device. Another method of electronically connecting a PCB with an electronic component includes using an elastomeric connector which includes electronically conductive elements, wherein the elastomeric connector further includes attachment features used to couple the elastomeric connector to the PCB and an electronic component. The elastomeric connector is elastically deformable and is generally fixed into position by compressing the elastomeric connector between the PCB and the electronic component. Such a connection also presents reliability issues with regards to the electrical connection, as the compression of the elastomeric connection must be a precise compression as too much compression or not enough compression will lead to connectivity issues. Thus, a need exists for a low profile connector system that is easily formed and provides a reliable connection between electronic components as disposed within an electronic device.

SUMMARY OF THE INVENTION

One aspect of the present invention includes a method of connecting electronic components by providing a mold having a cavity and inserting an elastomeric connector and one or more electronic components into the cavity. The method further includes compressing the elastomeric connector into electrical communication with the one or more electronic components and injecting an overmolded polymer into the cavity to form a casing around the compressed elastomeric connector and the one or more electronic components.

Another aspect of the present invention includes an electronic connecting system comprising a first electronic component and a second electronic component which are electrically coupled by an elastomeric connector. A casing is disposed about the elastomeric connector as well as the first electronic component or the second electronic component. The casing retains the elastomeric connector in a compressed condition against either of the first or second electronic components.

Yet another aspect of the present invention includes a method of connecting electronic components comprising the steps of providing a first electronic component and coupling an elastomeric connector thereto. The method further includes compressing the elastomeric connector into electrical communication with the first electronic component. A polymer is injection molded around the electrical connection of the elastomeric connector and the first electronic component to form a casing around the electrical connection. The method further includes retaining the elastomeric connector in a compressed condition and curing the casing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
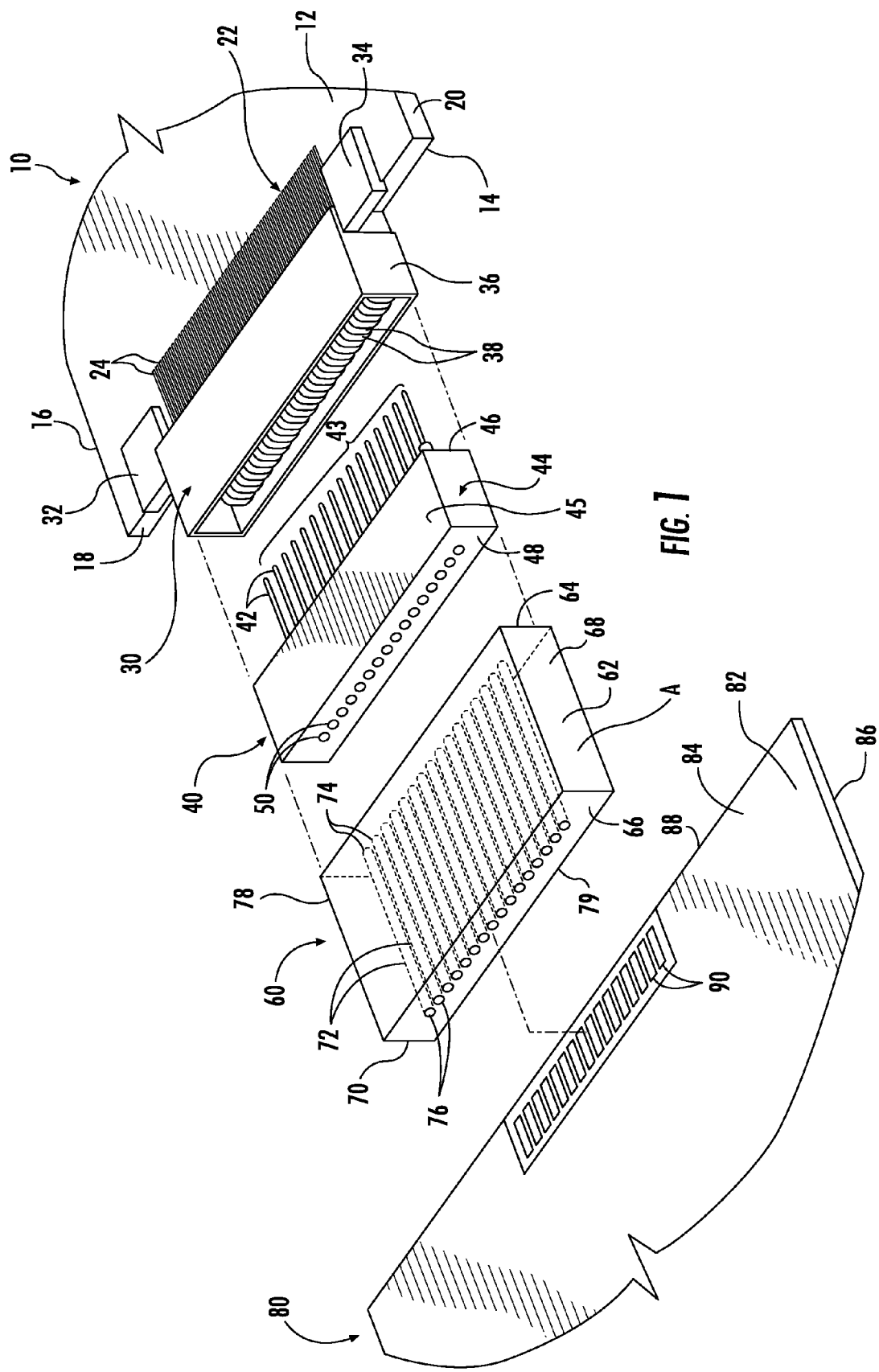
FIG. 1 is a fragmentary exploded perspective view of a printed circuit board and a substrate having connector assemblies disposed therebetween.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a portion of a printed circuit board (PCB) 10 is shown having upper and lower surfaces 12, 14 and outer end surfaces 16, 18, 20 which define a perimeter of the PCB 10. In the embodiment shown in FIG. 1, the PCB 10 includes a metallization portion 22 made up of a plurality of pads 24 which are comprised of an electrically conductive material, such as copper. The pads 24 may be plated to avoid corrosion and may be comprised of any suitable material having good electrical conductivity, such as gold, nickel or tin. In the embodiment shown in FIG. 1, the PCB 10 is shown coupled to an edge connector 30 which includes first and second attachment flanges 32, 34 and a connector housing 36 which extends outwardly from outer edge surface 18 of the PCB 10. The connecting flanges 32, 34 are shown mounted on the upper surface 12 of the PCB 10 and are adapted to retain the edge connector 30 in place on the PCB 10 at outer edge surface 18. It is contemplated that the edge connector 30 may include a copper buss which is aligned with and electronically coupled to the pads 24 of the metallization 22 disposed on the upper surface 12 of the PCB 10. In the embodiment shown in FIG. 1, the edge connector 30 is a female edge connector having a plurality of sockets 38 disposed within the connector housing 36. In this way, the edge connector 30 is electronically coupled to the PCB 10 and is adapted to provide a first connector for establishing an electrical connection with another electronic component as further described below. While the first connector is shown in FIG. 1 as an edge connector 30, it is contemplated that the first connector could be disposed on any edge or surface of the PCB 10, including a connector disposed on the upper or lower surfaces 12, 14 and extending outwardly therefrom.

As further shown in FIG. 1, a connector assembly 40 is a male connector which generally comprises a plurality of pins or leads 42 which extend outwardly from a pin carrier 44. The pins 42 may be comprised of a highly conductive material such as phosphor bronze, which may also be plated with gold. The pin carrier 44 includes a body portion 45 having a front connecting surface 46 and a rear connecting surface 48. The pins 42 extend completely through the body portion 45 of the pin carrier 44 and terminate at the rear connecting surface 48 in pads or traces 50. The pins 42 extending outwardly from the front connecting surface 46 of the pin carrier 44 define a pin array 43. It is contemplated that the pin carrier 44 may be comprised of a plastic material which may further include an outer metal casing. In assembly, the pins 42 of connector assembly 40 are adapted to be received in sockets 38 of edge connector 30, thereby providing a second connector to the connecting system as further described below.

As further shown in FIG. 1, an elastomeric connector 60, which is generally comprised of an elastomeric material such as silicone, is an elastically deformable connector having a body portion 62. The body portion 62 of the elastomeric connector 60 includes front and rear connecting surfaces 64, 66 and side walls 68, 70 to give the elastomeric connector 60 an overall rectangular configuration. While the embodiment shown in FIG. 1 includes a rectangular shaped elastomeric connector 60, the elastomeric connector 60 may have any suitable shape necessary for a particular application. The elastomeric connector 60 includes a plurality of generally parallel spaced-apart metal wires 72 which extend through the entirety of the body portion 62 and are preferably comprised of a highly conductive material such as gold or a gold plated metal. The wires 72 span the distance between the front and rear connecting surfaces 64, 66 of the body portion 62 of the elastomeric connector 60. The wires 72 culminate as exposed contact surfaces or traces 74, 76. In this way, the wires 72 are adapted to linearly conduct through the elastomeric material without conducting laterally within the material. The deformability of the elastomeric connector 60 helps to ensure for a reliable electrical connection between the elastomeric connector 60 and various electric components as further described below. The elastomeric connector 60 is shown in FIG. 1 in an at-rest condition A and is contemplated to be a low resistance elastomeric connector which is adapted to provide higher currencies for connections between electronic components.

As further shown in FIG. 1, an electronic panel substrate 80 is shown which may extend beyond the portion shown. The substrate 80 includes a body portion 82 having an upper surface 84 and a lower surface 86. The substrate 80 may be comprised of a flexible material or, preferably, a rigid material. Such materials may include thermoset laminates, an injection molded or extruded sheet of polyetherimide or other such thermoplastics. The substrate 80 may also be comprised of insulated metal sheets, glass, ceramics, graphite or any other material to which a conductive ink may be applied thereto. As shown in FIG. 1, the upper surface 84 of the substrate 80 includes a plurality of connecting pads 90 which are disposed along a front edge 88 of the substrate 80. The connecting pads 90 are contemplated to be comprised of a conductive ink which may be coated on the substrate 80 using a variety of methods known in the art. Such methods include screen printing, spraying, masking, vacuum plating or any combination thereof. The conductive ink is generally cured once applied to the substrate 80. Essentially, the connecting pads 90 provide a printed trace that connects with a circuit disposed within the substrate 80. Inks suitable for use with the present invention include thermosetting resins having graphite powder, carbon black or silver flakes incorporated therein. Other powdered conductive materials such as gold, silver, copper, nickel or other metal alloys may be used to create blended resins for the conductive ink as printed on the upper surface 84 of the substrate 80.

Figure 2:
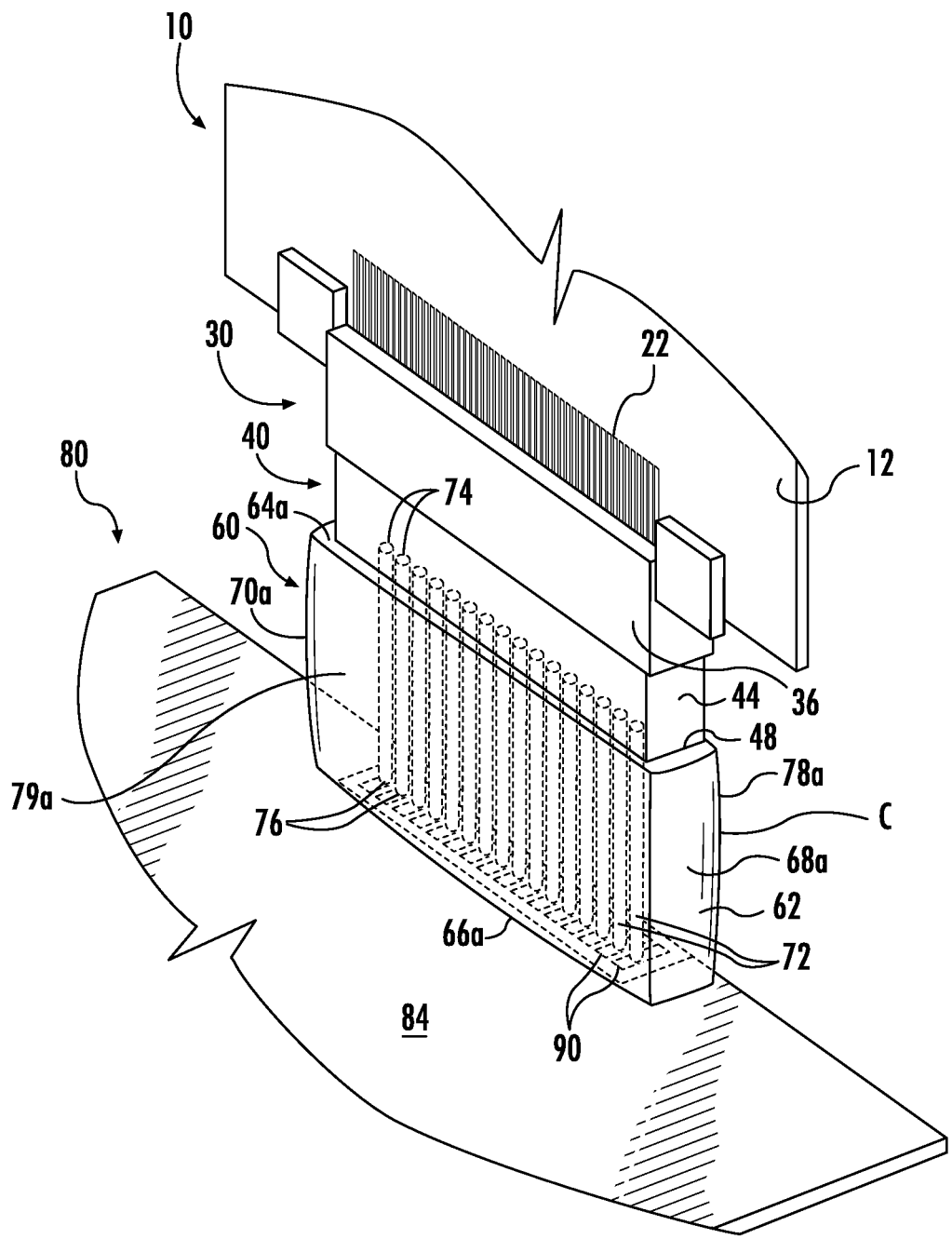
FIG. 2 is a fragmentary perspective view of the printed circuit board and substrate of FIG. 1 in a connected condition using the connector assemblies.

Referring now to FIG. 2, the printed circuit board 10 and substrate 80 are shown in a connected condition wherein the male connector assembly 40 has been mechanically and electronically coupled to edge connector 30 disposed on the PCB 10. Thus, it is contemplated that the pins 42 of the pin array 43 disposed on the first connecting surface 46 have been inserted into the sockets 38 of the edge connector 30 shown in FIG. 1. Further, the elastomeric connector 60 has been mounted directly on the upper surface 84 of the substrate 80. In this way, the wires 72 disposed within the body portion 62 are in electrical communication with the connecting pads 90 at traces 76, shown in FIG. 1, disposed on rear connecting surface 66 of the elastomeric connector 60. The perimeter surfaces 64, 66, 68, 70, 78 and 79 of the elastomeric connector shown in FIG. 1 are now shown in FIG. 2 in a compressed condition C such that the body portion 62 of the elastomeric connector 60 has been elastically deformed, thereby showing the compressed condition C of the elastomeric connector 60 resulting in bulging outer surfaces 64a, 66a, 68a, 70a, 78a and 79a. It is contemplated that the elastomeric connector 60, as shown in FIG. 2, has been compressed to an extent of about 5 to 15% to ensure sound electrical connection between the substrate 80 and connector assembly 40. As further shown in FIG. 2, connector assembly 40 is connected to the elastomeric connector 60 by rear connecting surface 48, having pads 50 disposed thereon as shown in FIG. 1, connecting to the pads or traces 74 of the wires 72 disposed on front connecting surface 64 of the elastomeric connector 60. Thus, as shown in FIG. 2, the PCB 10 is connected to the edge connector 30 via pads 24, the connector assembly 40 is electrically connected to the edge connector 30 via the pin array 43 and is further connected to the elastomeric connector 60 as described above. The elastomeric connector 60 is mounted on the upper surface 84 of the substrate 80 at rear connecting surface 66, such that the PCB 10 and the substrate 80 are now in electrical communication with one another as mechanically and electrically coupled thereto. To effectuate a reliable connection between the PCB 10 and the substrate 80, it is important that the elastomeric connector 60 remain in the compressed condition C as shown in FIG. 2. When the elastomeric connector 60 is in the compressed condition C, which is slightly compressed, solid contact is ensured between the pads 90 of the substrate 80 and the pads 50 of the connector assembly 40. The present invention is adapted to retain the compressed condition C of the elastomeric connector 60 as shown in FIG. 2 and further described below.

As shown in FIG. 2, the connector assembly 40 and the elastomeric connector 60 are disposed in a molded casing 100 which is injection molded on the substrate 80 to encase the connector assembly 40 and the elastomeric connector 60, while the elastomeric connector 60 is in the compressed condition C. In this way, the casing 100 provides a jacketing system for the elastomeric connector 60 to surround and retain the elastomeric connector 60 in the compressed condition C which, as described above, provides the most reliable connection between the elastomeric connector 60 and the connector assembly 40 and the substrate 80 as disposed therebetween. Thus, the electrical connection system 110 of the present invention provides for a reliable connection between electrical components, takes up minimal space as compared to a ZIF tailed system and further provides a lower cost option as compared to a ZIF system. Further, compressed elastomeric connector 60 and connector assembly 40 encased within the molded casing 100 provides an electrical connector system 110 which better resists shock and vibration as compared to known electrical connectors. This resistance to shock and vibration provides for a more reliable connection between electrical components as disposed in various electronic devices, as such devices are often subjected to outside forces which can disrupt the internal connections of the electronic device. Further, the electrical connector system 110 is a sealed system to provide a more robust environment as coupled to the substrate 80.

Figure 3:
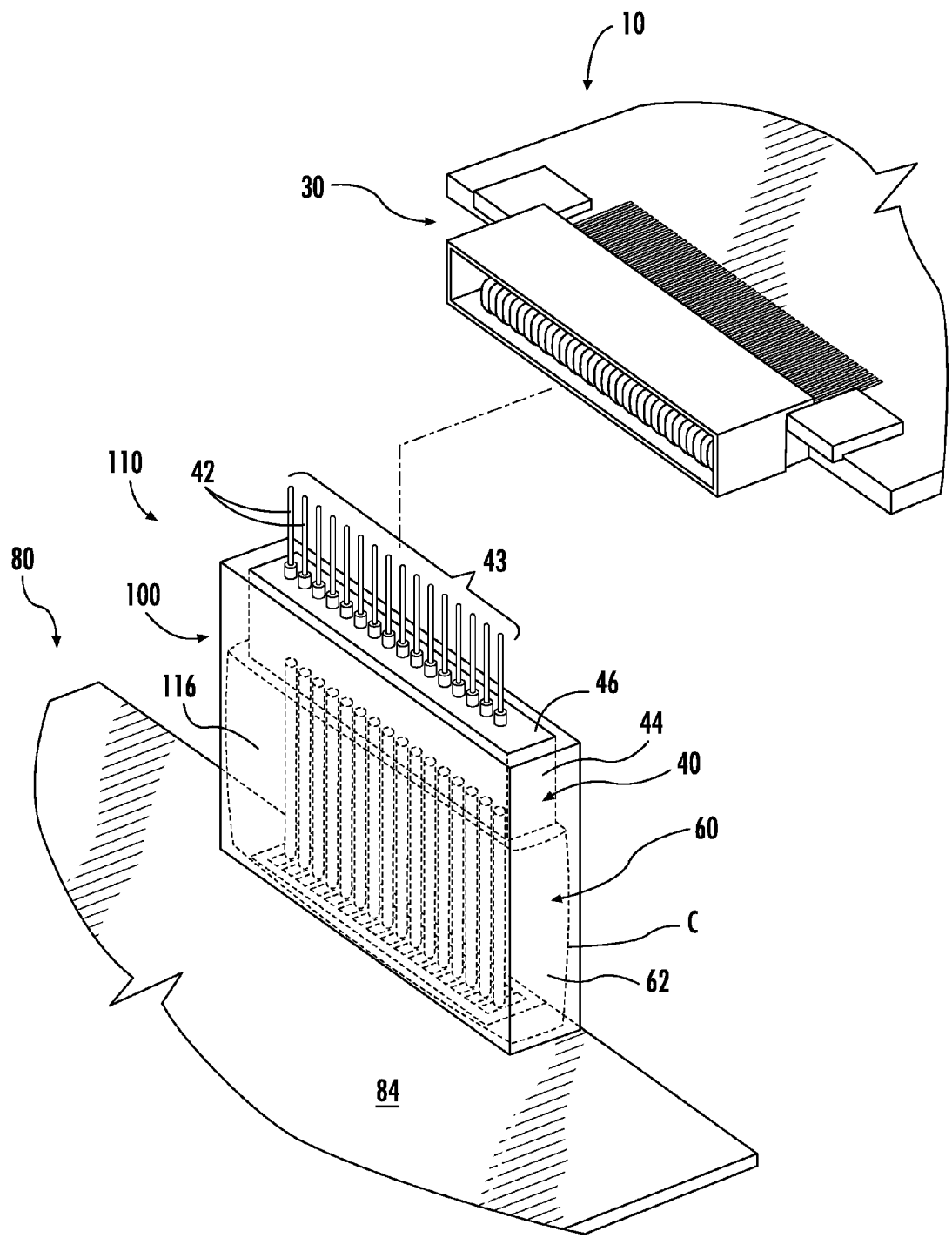
FIG. 3 is a fragmentary exploded perspective view of the substrate and printed circuit board of FIG. 2 as detached from the connector assemblies, wherein the connector assemblies are disposed within a casing of the present invention.
Figure 4:
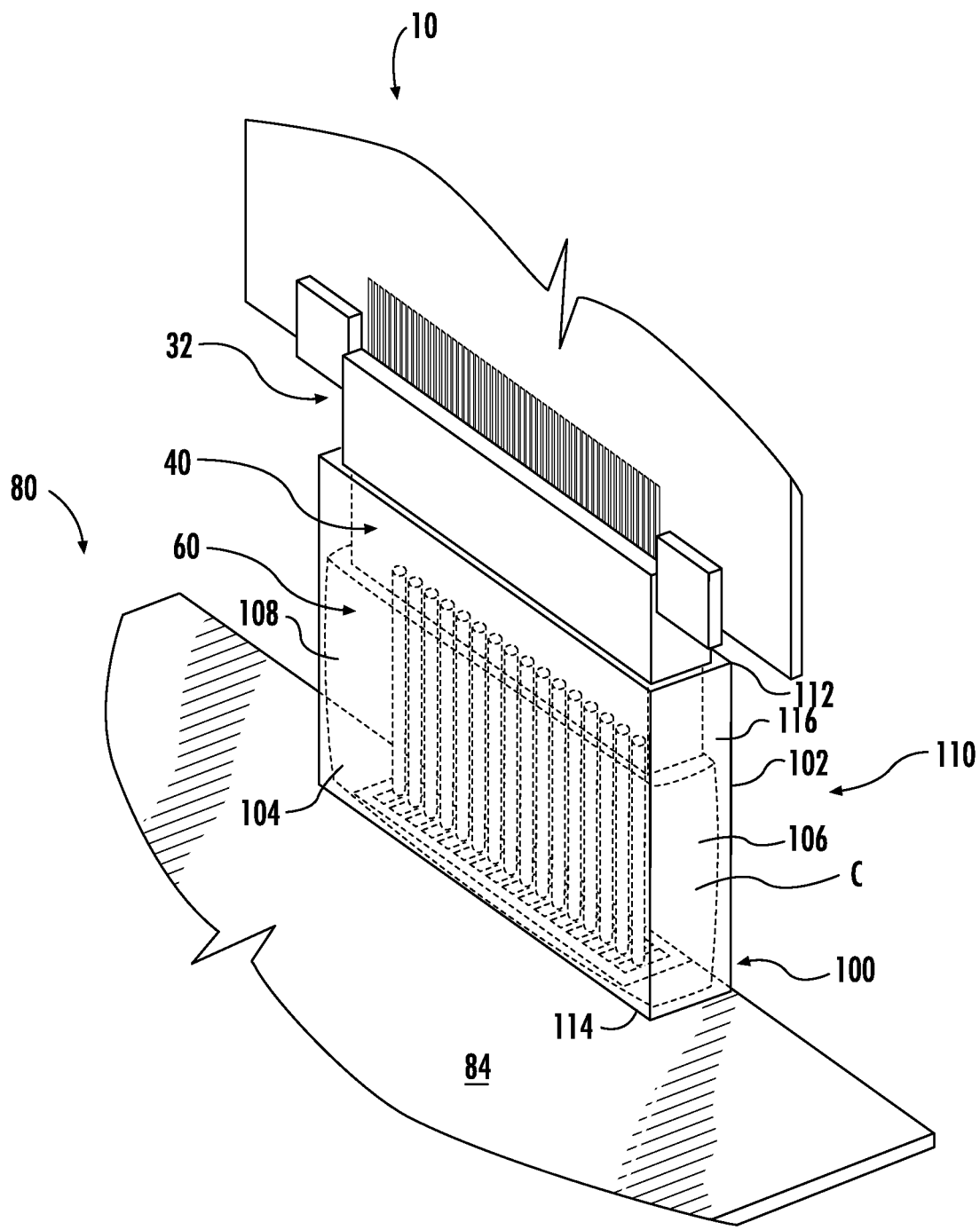
FIG. 4 is a fragmentary perspective view of the printed circuit board and substrate of FIG. 3 in a connected condition.

As further shown in the embodiments of FIGS. 3 and 4, the casing 100 includes front and rear surfaces 102, 104, side surfaces 106, 108 and upper and lower surfaces 112, 114. As specifically shown in FIG. 3, the connector assembly 40 is substantially disposed within an interior 116 of the casing 100 such that the front surface 46 of the connector assembly 60 is exposed through the top surface 112 of the casing 100. Together, the surfaces 102, 104, 106, 108, 112 and 114 define a perimeter around the interior 116 of the casing 100. The interior 116 is completely filled with a portion of body portion 44 of connector assembly 40 and the entire body portion 62 of the elastomeric connector 60 and the resin used to create the casing 100. The complete encasement of the elastomeric connector 60 and the connector assembly 40 is provided by these components being insert molded by an injection molding of a plastic resin used to form the casing 100 into a mold assembly. In this way, the casing 100 is molded to the substrate 80, the elastomeric connector 60 and the connector assembly 40. With the pin array 43 exposed and extending outwardly from the front surface 46 of the connector assembly 40, the PCB 10 is able to couple to the connector assembly 40 using edge connector 30, as shown in FIG. 4. Thus, the first connecting surface 46 of the connector assembly 40 is at least partially exposed through the casing 100.

In molding the casing 100 about the connector assembly 40 and the elastomeric connector 60, an insert molding method is used to ensure proper encasement of the components. Insert molding generally includes the steps of providing a mold having a mold cavity, placing the components (or inserts) in the mold cavity and injecting a resin material into and around the components. Insert molding, also referred to as overmolding, can be done using a variety of methods such as thermoplastic injection molding and thermoset injection, transfer and compression molding. For use with the present invention, a mold having a mold cavity is provided and the connector assembly 40, along with the elastomeric connector 60, are inserted therein. The substrate 80 is also inserted into the mold cavity as positioned in FIG. 4. The connector assembly 40 and the elastomeric connector 60 are positioned such that the connector assembly 40 is connected to the elastomeric connector 60 by rear surface 48, having pads 50 disposed thereon which are aligned with the contact surfaces or traces 74 of the elastomeric connector 60. Similarly the pads 90 of the substrate 80 are aligned with and connected to the contact surfaces or traces 76 disposed on the rear connecting surface 66 of the elastomeric connector 60. The elastomeric connector 60 is then elastically deformed to the compressed condition C and held in the compressed condition C between the substrate 80 and the connector assembly 40 within the mold cavity. The mold is then closed and a resin material is injected into the mold cavity in and around the inserts 80, 60 and 40. Suitable resin materials for use in forming the casing 100 include thermosets such as epoxy, phenolic and DAP, and thermoplastics such as nylon, acetal, PBT, polycarbonate, Polyphenylene oxide, Polyphenylene sulfide and others. The resin is allowed to harden and a strongly bonded, integrated assembly 110 is formed with the inserts overmolded by the polymer used to form the casing 100.

While the electrical connector 110 of the present invention is shown herein connecting the PCB 10 and the substrate 80 in a perpendicular configuration, it is contemplated that any suitable board-to-board connection can be enhanced by the arrangement described above, including but not limited to, Z-axis connections, stacked module connections and other such board-to-board connections where a low profile and reliable connection is desired.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of connecting electronic components, comprising:
    providing a mold having a cavity;
    inserting an elastomeric connector and a first electronic above the elastomeric connector and a second electronic component below the elastomeric component into the cavity;
    the elastomeric connector having a body portion surrounding a plurality of metal wires that extend along a length of the body portion and form contacts at opposite sides of the body portion;
    compressing the elastomeric connector into electrical communication with the first and second electronic components; and
    injecting an overmolded polymer into the cavity to form a casing entirely about the compressed elastomeric connector and most of the first electronic component.

2. The method of claim 1, wherein the body portion of the elastomeric connector includes first and second connecting surfaces at the contact locations, the first connecting surface being partially exposed through the casing, and the second connecting surface being electrical communication with the elastomeric connector.

3. The method of claim 2, wherein the step of injecting an overmolded polymer into the cavity further includes completely surrounding the entire body of the compressed elastomeric connector with the overmolded polymer to retain the elastomeric connector in a compressed condition.

4. The method of claim 3, wherein the second electronic components further includes an electronic panel substrate having a plurality of connecting pads.

5. The method of claim 4, wherein the elastomeric connector is compressed against the first and second electronic components to form an electrical connection there between.

6. An electronic connecting system, comprising:
    a first electronic component having a body portion surrounding a pin carrier;
    a second electronic component electrically coupled to the first electronic component by an elastomeric connector;
    the elastomeric connector having a body portion surrounding a plurality of metal wires that extend along a length of the body portion and form contacts at opposite sides of the body portion;
    a casing disposed about the entirety of the body of the elastomeric connector and most of the body of the first electronic component; and
    wherein the casing retains the elastomeric connector in a compressed condition against one of the first and second electronic components.

7. The electronic connecting system of claim 6, wherein the first electronic component includes a connector assembly having first and second connecting surfaces at opposite ends of the body portion, the first connecting surface being partially exposed through the casing, and the second connecting surface in electrical communication with the elastomeric connector.

8. The electronic connecting system of claim 7, wherein the elastomeric connector includes first and second connecting surfaces at the contacts, the first connecting surface being in electronic communication with the second surface of the first connector assembly.

9. The electronic connecting system of claim 8, wherein the second electronic component includes an electronic panel substrate having a one or more connecting pads disposed thereon.

10. The electronic connecting system of claim 9, wherein the elastomeric connector is compressed between the electronic panel substrate and the connector assembly, such that the second connecting surface of the elastomeric connector is in electrical communication with the one or more connecting pads of the electronic panel substrate to form an electrical connection there between.

11. A method of connecting electronic components, comprising:
    providing a first electronic component having a body portion with first and second connecting surfaces at opposite ends;
    coupling an elastomeric connector having a body portion surrounding a plurality of metal wires that extend along a length of the body portion and form contacts at opposite sides of the body portion to a contact surface of the first electronic component;
    compressing the elastomeric connector into an electrical connection with the first electronic component, wherein the body of the elastomeric connector bulges;
    injection molding a polymer around the electrical connection to form a casing around the electrical connection, wherein the casing surrounds the entirety of the body of the elastomeric connector having the metal wires therein and surrounds most of the body portion of the first electronic component;
    retaining the elastomeric connector in a compressed condition; and
    curing the casing.

12. The method of claim 11, wherein the second connecting surface of the first electronic component is disposed within the casing and the first connecting surface is at least partially disposed outside of the casing.

13. The method of claim 12, wherein the second connecting surface of the first electronic component is in electrical communication with the elastomeric connector.

14. The method of claim 13, wherein the step of providing a first electronic component further includes providing a second electronic component coupled to the other contact surface of the elastomeric connector.

15. The method of claim 14, wherein the second electronic component includes an electronic panel substrate having a plurality of connecting pads.

16. The method of claim 15, wherein the plurality of connecting pads are conductive ink pads.

* * * * *